US007886270B2

(12) United States Patent
Dryfoos et al.

(10) Patent No.: US 7,886,270 B2
(45) Date of Patent: Feb. 8, 2011

(54) METHODS, SYSTEMS, AND COMPUTER PROGRAM PRODUCTS FOR FILE VERSION CONTROL MANAGEMENT

(75) Inventors: Robert O. Dryfoos, Hopewell Junction, NY (US); Susan A. Pavlakis, Bethel, CT (US); Stephen E. Record, Block Island, RI (US); Glenn W. Sears, Jr., Ulster Park, NY (US)

(73) Assignee: International Business Machines Corporation, Armonk, NY (US)

( * ) Notice: Subject to any disclaimer, the term of this patent is extended or adjusted under 35 U.S.C. 154(b) by 1107 days.

(21) Appl. No.: 11/563,720

(22) Filed: Nov. 28, 2006

(65) Prior Publication Data

US 2008/0126440 A1 May 29, 2008

(51) Int. Cl.
*G06F 9/44* (2006.01)
*G06F 17/30* (2006.01)
(52) U.S. Cl. .................. 717/122; 717/170; 717/110; 707/999.2; 707/999.203
(58) Field of Classification Search .................. 717/122
See application file for complete search history.

(56) References Cited

U.S. PATENT DOCUMENTS

| 5,555,418 | A | * | 9/1996 | Nilsson et al. | 717/153 |
| 5,586,304 | A | * | 12/1996 | Stupek et al. | 717/170 |
| 6,154,878 | A | * | 11/2000 | Saboff | 717/173 |
| 6,272,678 | B1 | * | 8/2001 | Imachi et al. | 717/122 |
| 6,289,510 | B1 | * | 9/2001 | Nakajima | 717/170 |
| 6,336,217 | B1 | * | 1/2002 | D'Anjou et al. | 717/121 |
| 7,155,712 | B2 | * | 12/2006 | Takimoto | 717/170 |
| 7,539,976 | B1 | * | 5/2009 | Ousterhout et al. | 717/120 |
| 2002/0091720 | A1 | * | 7/2002 | Liu et al. | 707/203 |
| 2003/0061256 | A1 | | 3/2003 | Mathews et al. | |
| 2004/0098422 | A1 | * | 5/2004 | Levesque et al. | 707/203 |
| 2005/0027757 | A1 | * | 2/2005 | Kiessig et al. | 707/204 |

FOREIGN PATENT DOCUMENTS

CN 1449530 10/2003

* cited by examiner

*Primary Examiner*—Thomas K Pham
(74) *Attorney, Agent, or Firm*—Cantor Colburn LLP; Steven Chiu

(57) ABSTRACT

Methods, systems, and computer program products for file version control management are provided. Methods include receiving a loadset of at least one data file and activating the loadset. For each data file in the loadset, the data file is written to a target system and identified by a base name and a generation number. A symbolic link with an activation number is created in a version control file index (VCFX) to the data file written to the target system. An application view to the symbolic link is provided as the base name of the data file, and the application view to the symbolic link is limited based on an activation number of the application corresponding to the activation number of the symbolic link.

20 Claims, 5 Drawing Sheets

METHODS, SYSTEMS, AND COMPUTER PROGRAM PRODUCTS FOR FILE VERSION CONTROL MANAGEMENT

BACKGROUND OF THE INVENTION

This invention relates generally to computer file management, and more particularly to methods, systems, and computer program products for file version control management.

Real-time operating system (OS) software is typically used in systems that require fast, high-volume, high-throughput transaction processing capability. Systems that require around-the-clock operation with high reliability present an even greater set of challenges for OS and application software executing in such an environment. Applications that may require such an OS include reservation systems, banking systems, authorization systems, routing systems, and dispatching systems, where system operators cannot afford downtime for system maintenance or upgrades. These applications demand high performance, particularly when incorporated into a large-scale, wide area, multi-user network. In order to upgrade and improve applications running on a real-time OS without halting or resetting the system on which the OS is executing, special methods of file version management are necessary.

One method of updating application programs in a system executing a real-time OS, referred to as an online system, is to use a separate system, referred to as an offline system, to develop new application programs and then transfer the application programs to the online system. Some online systems contain multiple processors, which can each execute tasks based on requests from various users of the online system. The processors in the online system typically have shared access to a program base that holds the application programs. When a task executes, a particular version of an application program is invoked. As task execution varies in duration, a conflict can arise when an application program is updated while a task is actively executing a version of the application program. For example, an online system may contain two processors, with the first processor executing a task that started using version 1.0 of an application program, while the second processor is idle. When version 2.0 of the application program is transferred to the online system and activated while the first processor is still executing version 1.0, the online system must accommodate version 2.0 while not interfering with version 1.0 still in use by the first processor. A task may begin executing on the second processor using version 2.0 of the application program before the task executing version 1.0 on the first processor completes. This potential for conflict within the online system necessitates special version management techniques to allow multiple versions of an application program to exist within the online system, while maintaining the association between application versions and tasks executing on different processors.

As application programs have evolved, there is a greater dependency upon data files that support or are populated by application programs. Data files are typically managed independent of application programs, using a file system rather than a program base. Unlike application programs, data files are not typically managed through version control in a file system environment. Furthermore, there are file types that do not fit into a conventional category of either application programs or data files, such as Java ".jar" and ".class" files. Since there are a wide variety of file types and application programs, it would be beneficial to develop a method to manage all of these arbitrary byte stream files, controlling the version of each file or application program made available to each processor in an online system. Version control management should be robust enough to manage a group of arbitrary byte stream files associated with a task such that multiple versions may exist while tasks are active. Furthermore, upon completion of tasks using older versions of the arbitrary byte stream files, stored baseline versions of the arbitrary byte stream files should be updated so that future invocations of tasks access the latest versions of files and application programs.

While file version management systems exist in the context of software development environments, such systems fail to handle the unique problems faced by a multiple processor real-time execution environment. For example, a file version control management system may support the creation of multiple versions of source code and allow association of different versions of source code with different versions of software build files, such that various versions of an application program can be reproduced. Other file version management systems are typically used for purposes of backup and recovery, where file versions are identified by the chronology of creation and modification. However, such systems fail to manage the deployment of an application program and associated files in a system where a previous version of the application program and associated files are still in use, such as the previously described online system.

Accordingly, there is a need for a method to manage multiple versions of arbitrary byte stream files in a multiple processor real-time execution environment such that different file versions can be accessed by each processor within the multiple processor real-time execution environment without interfering with the other processors.

BRIEF SUMMARY OF THE INVENTION

Embodiments include a method for file version control management. The method includes receiving a loadset of at least one data file and activating the loadset. For each data file in the loadset, the data file is written to a target system and identified by a base name and a generation number. A symbolic link with an activation number is created in a version control file index (VCFX) to the data file written to the target system. An application view to the symbolic link is provided as the base name of the data file, and the application view to the symbolic link is limited based on an activation number of the application corresponding to the activation number of the symbolic link.

Additional embodiments include a system for file version control management. The system includes a target file system, a VCFX, and an online loader application. The online loader application receives a loadset of at least one data file and activates the loadset. For each data file in the loadset, the data file is written to the target file system and identified by a base name and a generation number. A symbolic link with an activation number is created in the VCFX to the data file written to the target file system. An application view to the symbolic link is provided as the base name of the data file, and the application view to the symbolic link is limited based on an activation number of the application corresponding to the activation number of the symbolic link.

Further embodiments include a computer program product for file version control management. The computer program product includes a storage medium readable by a processing circuit and storing instructions for execution by the processing circuit for facilitating a method. The method includes receiving a loadset of at least one data file and activating the loadset. For each data file in the loadset, the data file is written to a target system and identified by a base name and a generation number. A symbolic link with an activation number is created in a VCFX to the data file written to the target system. An application view to the symbolic link is provided as the base name of the data file, and the application view to the symbolic link is limited based on an activation number of the application corresponding to the activation number of the symbolic link.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS

Figure 1:
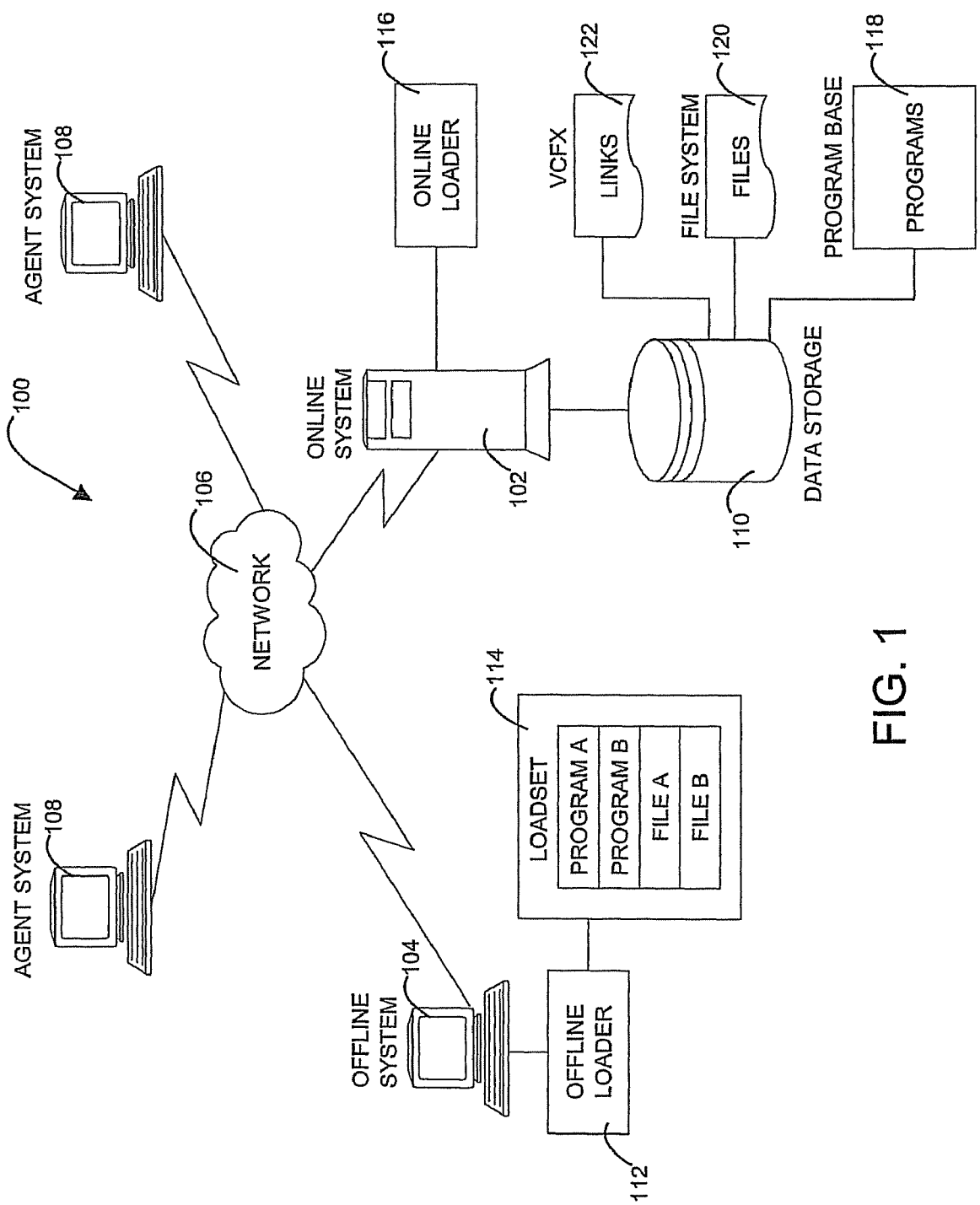
FIG. 1 is a block diagram of a version control management system that may be implemented by exemplary embodiments.

Exemplary embodiments manage multiple versions of arbitrary byte stream files in a multiple processor real-time execution environment such that different file version can be accessed by each processor within the multiple processor real-time execution environment without interfering with the other processors.

In exemplary embodiments, an online system is a multiple processor real-time execution environment, with maintenance and updates of the online system managed by an offline system. Application programs, also referred to as "applications" or "programs" herein, developed on the offline system may be grouped together as a loadset for more efficient contemporaneous updates of the online system. A loadset may contain one or more programs that are transferred from the offline system to the online system. A loadset may also contain data files or any type of arbitrary byte stream files that support program execution. A data file, also referred to as a "file", is any collection of binary or textual information and may include, but is not limited to: configuration parameters, data structure formats, templates, operational information, support information, command scripts, or any other type of information that is ancillary to a program. A data file may also include executable files, such as Java ".jar" and ".class" files. In exemplary embodiments, the online system stores programs in a program base and files in a file system. Through the use of a loadset, programs and files are dynamically managed as a unit. As used herein, the term "mounting" or "mountable" refers to attaching or linking to a directory of files or file system. As used herein, the term "symbolic link" refers to a pointer or other reference to a file.

In exemplary embodiments, there are two ways in which data files become part of a loadset. Files that are resident on the offline system on which the loadset is created can be directly included in the loadset along with any associated programs. Files that are already resident on the online system can be affiliated with the loadset when the loadset is created on the offline system. Once the loadset is loaded to the online system, any affiliated files may be deployed as new file versions to allow updates while the loadset is activated without disturbing the original file contents.

In exemplary embodiments, an online loader provides version control for loadsets to maintain a consistent execution environment for long running programs, even as the loadsets containing programs, or other programs on which they depend, are dynamically deactivated or unloaded, and new versions of loadsets are loaded and activated. In exemplary embodiments, loadsets are managed on the online system through operations such as activation, acceptance, deactivation, and unloading. When a loadset is loaded on the online system, the files within the loadset are made accessible through activation. In exemplary embodiments, activation creates a copy of each file or program within the loadset without removing or replacing any older versions. During the activation process, the online loader on each processor generates a processor unique activation number to represent that activation. Tasks subsequently created on that processor will be assigned that same activation number until such time as the loader generates a new activation number for the next activate or deactivate request. Whenever a task makes reference to a file or program, its activation number implicitly determines which version of the file or program the task may use. When tasks running older versions of programs or accessing older versions of files complete, the new program and file versions can be accepted. The acceptance process updates files in the file system and records in the program base, while also removing the symbolic links and other artifacts created during the load and activation process. Once a file or program has been accepted, future task invocations will access the accepted version until another loadset arrives with a newer version. Loadsets can also be deactivated, that is run through activation without being accepted. Similarly, a loadset can be unloaded through removal of the loadset from memory. There are many other potential operations that can be performed relative to loadsets that will be apparent to one skilled in the art.

Turning now to the drawings in greater detail, it will be seen that in FIG. 1 there is a block diagram of a system 100 upon which file version control management can be implemented in accordance with exemplary embodiments. The system 100 of FIG. 1 includes an online system 102 in communication with an offline system 104 communicably coupled over a network 106. The online system 102 may be high-speed processing devices (e.g., mainframe computers) that handle large volumes of processing. In exemplary embodiments, the online system 102 executes a real-time operating system (OS) and application programs. The online system 102 may contain multiple processors that access a common pool of programs and execute tasks. In exemplary embodiments, the offline system 104 is a desktop, a workstation, or other general-purpose computer device that performs maintenance tasks and updates to the online system 102. While only a single online system 102 and a single offline system 104 are shown in FIG. 1, it will be understood that multiple online or offline systems may be implemented, each in communication with one another via direct coupling or via one or more networks. For example, multiple online or offline systems may be interconnected through a distributed network architecture. The single online system 102 may also represent a loosely coupled complex of online systems accessing a direct access storage device, such as data storage device 110.

The network 106 may be any type of communications network known in the art. For example, the network 106 may be an intranet, extranet, or an internetwork, such as the Internet, or a combination thereof. The network 106 may be a wireless or wireline network. The network 106 may be homogenous or a collection of various sub-networks.

One or more agent systems may also be coupled to the network 106, such as agent systems 108. In exemplary embodiments, one or more tasks executing on the online system 102 enable the agents systems 108 to access and update data stored on the data storage device 110. The online system 102 provides real-time or near real-time access for multiple agent systems 108. In exemplary embodiments, the agent systems 108 may request execution of application programs being controlled by the file version control management process described herein. The agent systems 108 represent users spread out over a geographically diverse area performing such tasks as placing reservations, electronically transferring funds, performing account authorizations, or dispatching services.

The data storage device 110 refers to any type of storage and may comprise a secondary storage element, e.g., hard disk drive, tape, or a storage subsystem that is external to the online system 102. Types of data that may be stored in data storage device 110 include, but are not limited to: programs, files, databases, and archive data that are infrequently accessed. It will be understood that the data storage device 110 shown in FIG. 1 is provided for purposes of simplification and ease of explanation and is not to be construed as limiting in scope. To the contrary, there may be multiple data storage devices utilized by the online system 102 in exemplary embodiments.

In exemplary embodiments, the online system 102 is a high reliability real-time system, such as IBM's Transaction Processing Facility (TPF). The online system 102 may execute multiple tasks on multiple processors to support requests from the agent systems 108. In exemplary embodiments, files and programs stored on the data storage device 110 are accessed and managed through various logical partitions. Programs resident within the data storage device 110 are managed through a program base 118. Files stored within the data storage device 110 are accessed and managed through a file system 120. Although only one program base 118 and one file system 120 are depicted in FIG. 1, it will be understood that multiple program bases and file systems could be implemented. In exemplary embodiments the file system 120 is a portable operating system interface for Unix (POSIX) compatible file system. The file system 120 may be a collection of mountable file systems with different permission levels assignable based upon a particular owner, user, or group. In exemplary embodiments, the file system 120 is a processor shared TPF collection support file system (TFS). The use of permissions limits access and capability for performing operations within the file system such as read, write, remove, or execute.

A virtual file system (VFS) architecture may be used to establish a new file system for managing file versions deployed as a loadset. Through a VFS, full file system functionality can be supported on a versioned directory structure by representing versioned files entries in a subdirectory of a mounted, explicitly versioned root. Symbolic links permit files under version control to be treated by users and application programs as though the files reside in any directory in any file system.

In exemplary embodiments, an application view of files under version control is provided separately on each processor in the online system 102 through a mountable, processor unique, memory resident file system, referred to herein as a version control file index (VCFX) 122. The directory structure in the VCFX 122 may be organized by file name and activation number. An activation number is used to control the file version accessed or returned upon a request. In exemplary embodiments, each file in the VCFX 122 is a symbolic link referencing a file version located elsewhere in the processor shared file system 120. The VCFX 122 appears to an application as if it contains only those file versions that the application is eligible to access based on activation numbers. In exemplary embodiments, the files are known by their base names, and extra levels of hierarchy based on activation number are suppressed. This appearance may be provided by special implementations of relevant file system operations in a manner that is fully transparent to ordinary users and applications.

In exemplary embodiments, updates to entries in the VCFX 122 are performed as a result of commands through an online loader application 116. The online loader application 116 may support a variety of commands to perform activities such as activation, acceptance, removal, and re-inclusion of entries in the VCFX 122. In addition to responding to commands, the online loader application 116 performs policing activity such as removing deleted loadsets when they are no longer needed. In exemplary embodiments, the online loader application 116 supports selective activation of a loadset. Selective activation provides control over which tasks have access to the loadset.

In exemplary embodiments, the offline system 104 executes a Unix-like operating system, such as Linux. The offline system 104 may support various development tools for creating application programs and files compatible with the online system 102. An offline loader application 112 runs on the offline system 104 to support loadset creation. The offline loader application 112 provides commands to include files and application programs resident on the offline system 104 in a loadset, such as loadset 114. A command to create a loadset on the offline system 104 may include a list of programs and/or files. The loadset 114 of FIG. 1 includes two programs and two files. However, the loadset 114 is merely one example, as it will be understood that a loadset can include any combination of programs and/or files. In creating the loadset 114, the user of the offline system 104 may incorporate parameters such as a specific target location in the online system 102 where the files or programs will be stored. In exemplary embodiments, programs are targeted for storage within the program base 118 and files are targeted for storage within the file system 120. If specific target locations for files or programs are not specified during loadset creation, a default value may be used.

In exemplary embodiments, when an included file is deployed at loadset activation time in the online system 102, the file's owner name, group name, and permission bits are set to the same values as they were for the offline copy of the file; however, if either the owner name or the group name is not defined in the online system 102, a default value is substituted. A user of the offline system 104 may program specific values for a file's owner name, group name, and permission bits.

The offline loader application 112 can specify that files residing within the file system 120 should be affiliated with the loadset 114 when the loadset is loaded by the online loader application 116. In exemplary embodiments, when an affiliated file is deployed at loadset activation time, the file's owner name, group name, and permission bits are set to the same value as in the original online copy of the file. As with files directly included in a loadset, a user of the offline system 104 may program specific values for the affiliated file's owner name, group name, and permission bits.

In exemplary embodiments, all versions of a particular file subsequently created in a target file system, such as the file system 120, as a result of loadset activation are established with the same owner, group, and permission settings as the included or affiliated data file itself. All other entities (e.g., subdirectories and links) created in the target file system to facilitate access to these versions, as well as all entities created in the VCFX 122, are owned by a designated user. In exemplary embodiments, the designated user is "vcfx" in group "bin", and write permission is granted only to the owner. Permission control through the designated owner prevents infelicitous renaming or removal of base files or any subsequent versions. Furthermore, permission control within the VCFX 122 also prevents creation of undesired files among file versions and blocks write attempts by unauthorized programs or users.

In exemplary embodiments, when the loadset 114 is loaded to the online system 102 through the online loader application 116, the contents of the loadset 114 is installed in records. The records may also hold affiliated files if they are part of a loadset. The records provide a temporary holding area for subsequent deployment to the target file system for each processor in the online system 102. When a loadset with included or affiliated data files is activated on a processor in the online system 102 by the online loader application 116, the files are deployed to a file system, such as the file system 120, identified by the target locations specified in the loadset. In exemplary embodiments, a loadset, such as the loadset 114, references multiple file systems, including file systems that are not depicted in FIG. 1 but are accessible through the online system 102. Symbolic links may be established to allow the correct versions of the deployed files to be accessed transparently by reference to their ordinary names. In exemplary embodiments, name resolution for the deployed files is routed through the VCFX 122, where version resolution occurs. The symbolic linking process is described in greater detail herein.

Figure 2:
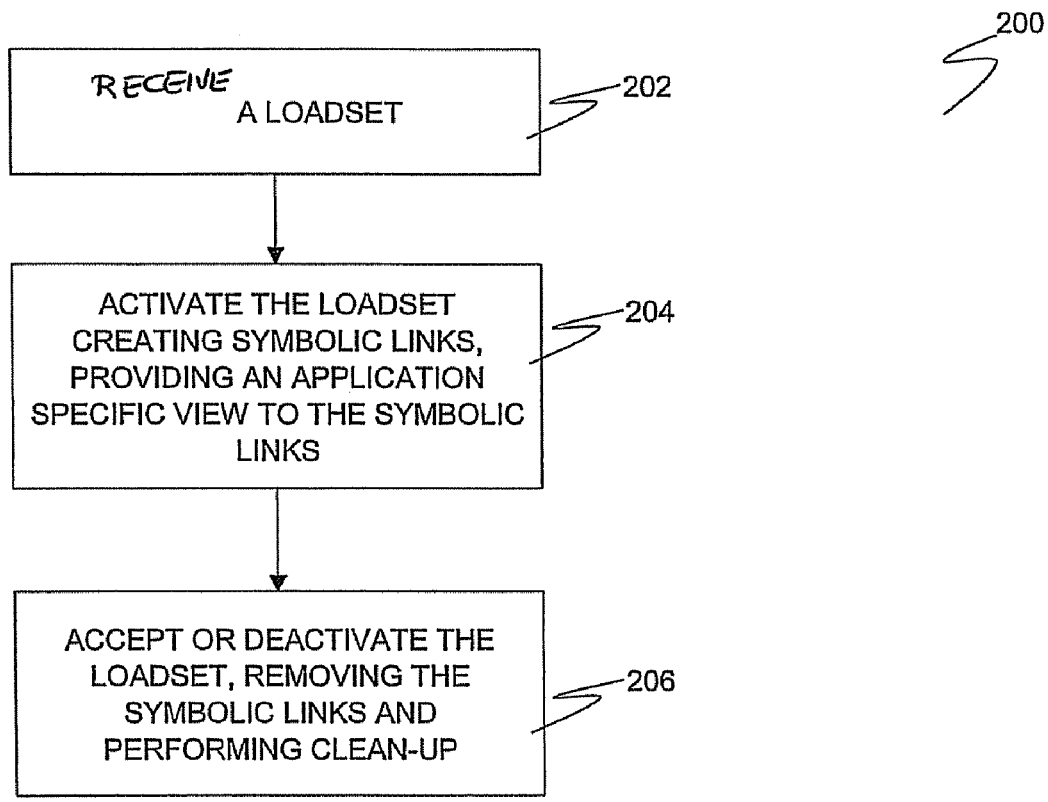
FIG. 2 is a flow diagram describing a version control management process in exemplary embodiments.

Turning now to FIG. 2, a process 200 for implementing a version control management process will now be described in accordance with exemplary embodiments. At block 202, a loadset including at least one data file is received, or loaded, on the online system 102 through the online loader application 116. At block 204, the loadset on the online system 102 is activated through the online loader application 116. The activation process includes writing each data file in the loadset to the target file system 120 with a generation number which is unique across the loosely coupled processor complex. The activation process also includes creating a symbolic link with an activation number in the VCFX 122 to each data file on the target file system 120 with a generation number. Thus the VCFX on each processor provides the essential mapping of activation numbers, which are processor unique, to generation numbers, whose scope spans the entire processor complex. An application view of the symbolic link is provided as a base name of the data file. The application view to the symbolic link is limited based on an activation number of the application corresponding to the activation number of the symbolic link. At block 206, the activated loadset is either accepted or deactivated. When the loadset is accepted, the data file on the target file system 120 with a generation number is renamed to a base name of the data file, and the symbolic link is removed. When the loadset is deactivated, the symbolic link is removed, and the data file on the target file system 120 with a generation number is also removed. A further clean-up process is performed to remove any remaining links that may no longer be in use. Other processes may also be performed to loadsets, such as exclusion of files or programs, and reinclusion of files and programs in loadsets.

Figure 3:
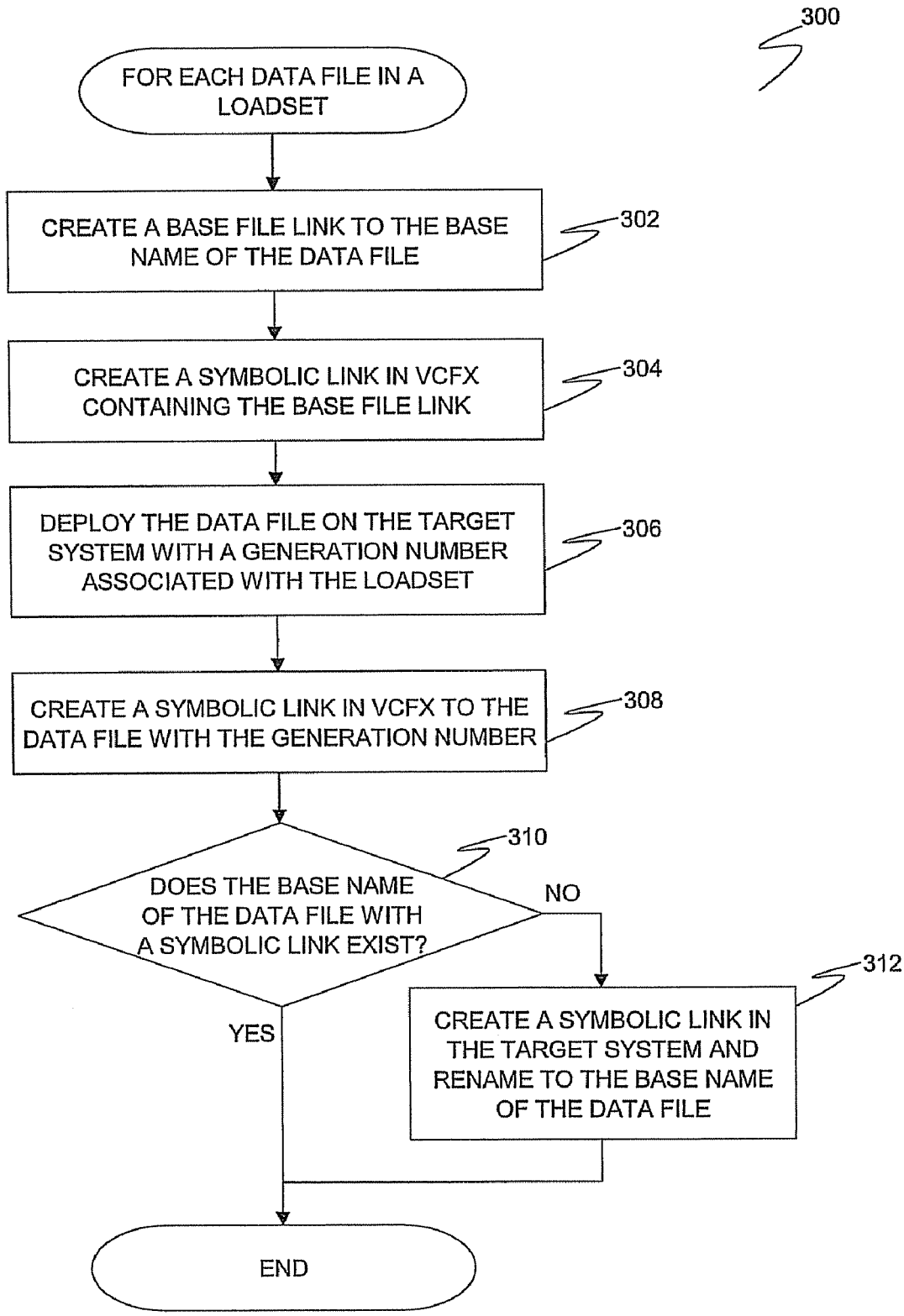
FIG. 3 is a flow diagram describing a symbolic linking process in exemplary embodiments.

Turning now to FIG. 3, a process 300 for implementing symbolic linking in the VCFX 122 will now be described in accordance with exemplary embodiments. Symbolic linking is performed for each included or affiliated data file on each processor in the online system 102 on which a loadset is activated. At block 302, a base file link is created on the target system to the base name of the data file. For example, a link named "targetloc/.filename/.0" may be created as a link to the base file "targetloc/filename". This step may fail harmlessly if either "targetloc/.filename/.0" already exists or "targetloc/filename" does not exist. The base file link provides access to the base file through the VCFX 122, as may be required while one or more other versions of the file are active.

At block 304, a symbolic link is created in the VCFX 122 containing the base file link of block 302. In exemplary embodiments, if the linking to the base file was successful in block 302, then a symbolic link is created in the VCFX 122. For example, a symbolic link named "vcfx/targetloc/filename/.0" may be created in the VCFX 122 containing a base file link named "targetloc/.filename/.0".

At block 306, a data file is deployed in the target file system with a generation number associated with the loadset. For example, a data file may be deployed named "targetloc/.filename/.gen#" in the target file system, where "gen#" is a unique positive and monotonically increasing generation number associated with this loading of the loadset.

At block 308, a symbolic link to the data file with the generation number is created in the VCFX 122. In exemplary embodiments, the symbolic link includes an activation number for associating the symbolic link with the generation number of the loadset. For example, a symbolic link named "vcfx/targetloc/filename/.act#", where "act#" is an activation number, may be created in the VCFX 122 containing a target link named "targetloc/.filename/.gen#". Additionally, the loadset name and current activation number may be written to a table available to the VCFX 122 for future reference.

At block 310, if the base name of the data file, such as "targetloc/filename", with a symbolic link to the VCFX 122 (i.e., not the base file itself) exists, then the process ends; otherwise, block 312 is performed. The symbolic link may have been created by another processor within the online system 102. The symbolic link may also exist as a result of a previous activation, which has not yet been cleaned up, pending the completion of another task.

At block 312, a symbolic link is created in the target system and is renamed to the base name of the data file. For example, a symbolic link temporarily named "targetloc/.filename/.slnk" containing "vcfx/targetloc/filename" may be renamed to "targetloc/filename". Renaming the symbolic link provides the target file system with an entity through which the versioned file may be conveniently accessed. In exemplary embodiments, the rename operation updates the directory atomically, providing consistent and uninterrupted access to the entity named "targetlec/filename".

If the target file system provides multiple processors within the online system 102 access to common files, then the other processors on which the loadset is not activated may perform the symbolic linking defined in block 304 to maintain access to the base file. In exemplary embodiments, block 304 is performed implicitly after restart on a first access to a file with an active version on another processor within the online system 102.

When an application executing on the online system 102 issues a function call that requires resolving a path name in the VCFX 122 (e.g., "vcfx/targetloc/filename"), the file system 120 obtains the activation level of the calling application and then determines which (if any) of the existing symbolic links (e.g., "vcfx/targetloc/.filename/.act#") is appropriate to follow for the calling application.

Figure 4:
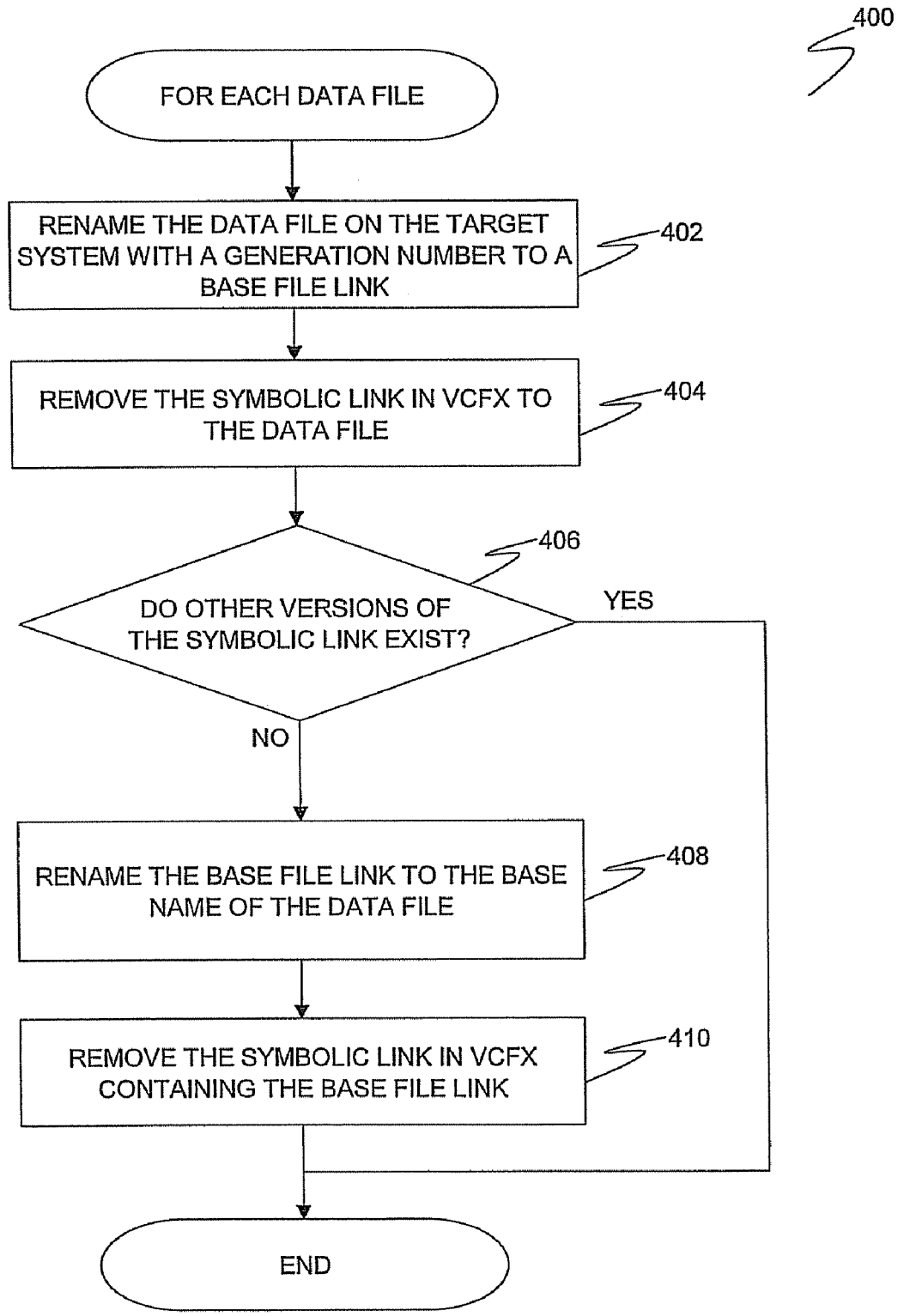
FIG. 4 is a flow diagram describing a symbolic link removal process in exemplary embodiments.

Turning now to FIG. 4, a process 400 for implementing removal of symbolic linking in the VCFX 122 will now be described in accordance with exemplary embodiments. When an activated loadset with included or affiliated data files is accepted through the online loader application 116, the symbolic links created by the symbolic linking process 300 can be removed, and the files renamed so that they can be accessed directly. In exemplary embodiments, each processor on the online system 102 performs the process 400 for each included or affiliated data file. At block 402, the data file on the target system with a generation number is renamed to a base file link. For example, the file "targetloc/.filename/.gen#" may be renamed to "targetloc/.filename/.0". No renaming occurs if the target file system is read-only. In exemplary embodiments, the renaming of the data file atomically unlinks the base file, (e.g. "targetloc/.filename/.0"), if it exists. The file system 120 may support the renaming operation even if the file has already been renamed by another processor within the online system 102.

At block 404, the symbolic link (e.g., "vcfx/targetloc/filename/.act#") in VCFX 122 to the data file is removed. At block 406, if any other versions of the symbolic link (e.g., "vcfx/targetloc/filename/.act#", where act# is greater than 0) exist, then the process terminates; otherwise, block 408 is performed. When symbolic links remain, this is indicating that versions of the base file are still in use by other tasks at different activation levels.

At block 408, the base file link is renamed to the base file name of the data file. For example, "targetloc/.filename/.0" is renamed to "targetloc/filename" (unless the target file system is read-only). The renaming process may atomically remove the symbolic link (e.g., "targetloc/filename"). The file system 120 may support the renaming operation even if the file has already been renamed by another processor within the online system 102. At block 410, the symbolic link in the VCFX 122 containing the base file link (e.g., "vcfx/targetloc/filename/.0") is removed, if the symbolic link exists.

Figure 5:
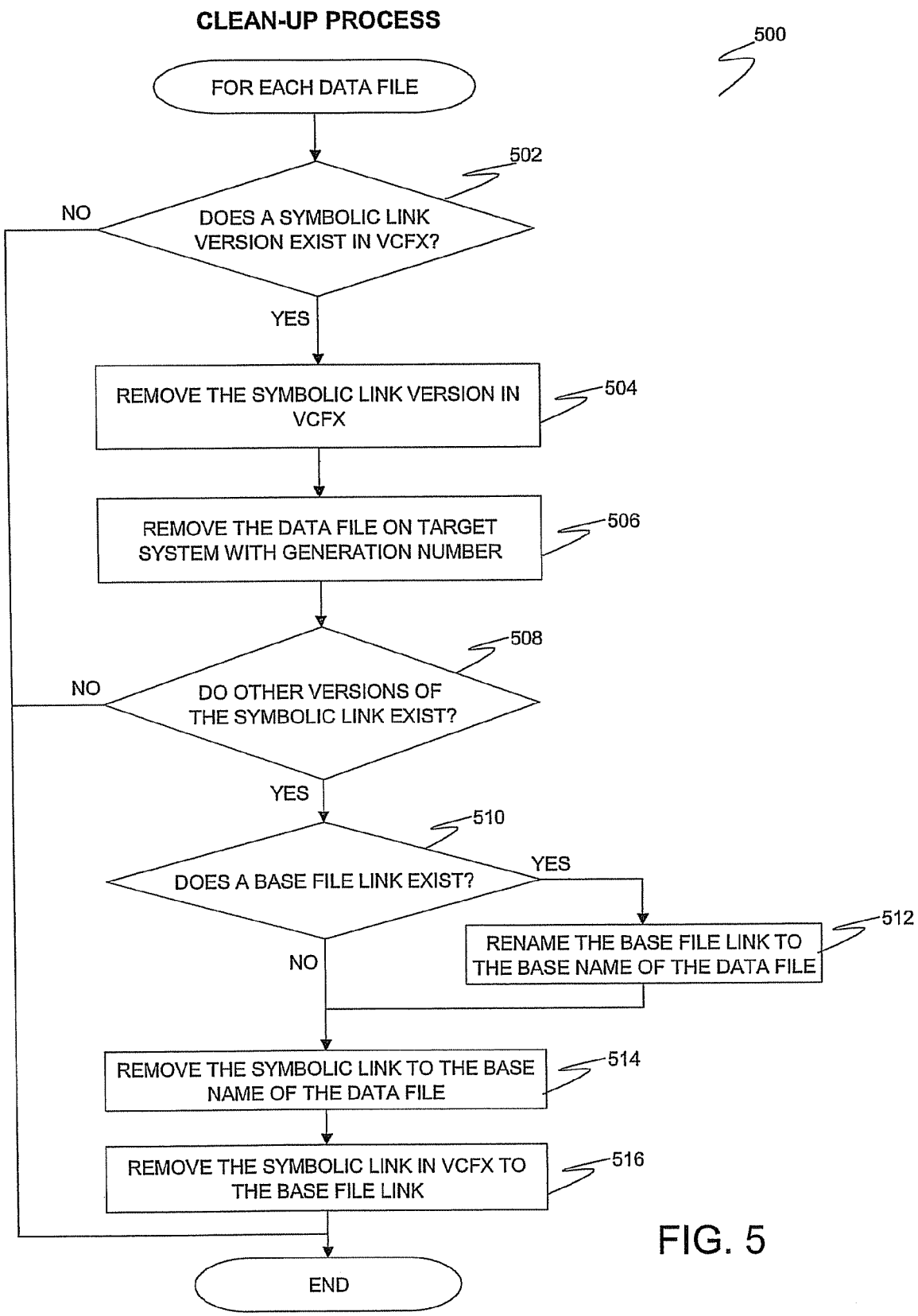
FIG. 5 is a flow diagram describing a clean-up process in exemplary embodiments.

Turning now to FIG. 5, a process 500 for implementing a clean-up process will now be described. In exemplary embodiments, when a loadset is deactivated or accepted through the online loader 116, the current activation number of the loadset is communicated to the VCFX 122. The VCFX 122 uses the activation number to arrange for correct processing of lookups by tasks running at higher activation levels. When the policing function of the online loader 116 observes that the activation level is empty, a cleanup process is performed for each included or affiliated data file on each processor on which the loadset had been activated.

At block 502, if a symbolic link version exists in the VCFX 122 (e.g. "vcfx/targetloc/filename/.act#"), then block 504 is performed; otherwise, the process terminates as the loadset has been accepted and there is nothing left to clean up. At block 504, the symbolic link version in the VCFX 122 (e.g., "vcfx/targetloc/filename/.act#") is removed. At block 506, the data file on the target system with a generation number (e.g., "targetloc/.filename/.gen#") is removed, unless the target file system is read-only. In exemplary embodiments, the target file system is a TFS and thus processor shared, and removal is performed by the last processor to deactivate within the online system 102.

At block 508, if other versions of the symbolic link (e.g., "vcfx/targetloc/filename/.act#", where act# is greater than 0) exist, then block 510 is performed; otherwise, the process terminates. The existence of another version of the symbolic link indicates that a version of the base file is still in use by other activation levels.

At block 510, if a base file link (e.g., "targetloc/.filename/.0") exists, then block 512 is performed; otherwise, block 514 is performed. At block 512, the base file link (e.g., "targetloc/.filename/.0") is renamed to the base name of the data file (e.g., "targetloc/filename"), unless the target file system is read-only. At block 514, the symbolic link to the base name of the data file (e.g. "targetloc/filename") is removed. Some file systems, such as file system 120, may combine blocks 512 and 514 as an atomic removal of the symbolic link upon renaming. In other file systems, removal of the symbolic link (e.g., "targetloc/filename") is an independent operation, provided that the target file system is not read-only. In exemplary embodiments, the target file system is a TFS and thus processor shared, and removal is performed by the last processor to deactivate within the online system 102.

At block 516, the symbolic link in the VCFX 122 to the base file link (e.g. "vcfx/targetloc/filename/.0") is removed, provided that the symbolic link still exists. In exemplary embodiments, the target file system is a TFS and thus processor shared, and removal is performed by the last processor to deactivate within the online system 102; in addition, block 516 is performed on processors in the online system 102 on which the loadset had not been activated. When a loadset is deleted by the online loader 116, any included or affiliated data files contained in records are deleted along with the programs themselves.

In exemplary embodiments, there are special considerations that must be observed when managing groups of programs and files as loadsets. For example, loadsets may be intersecting when they contain different versions of common included or affiliated data files or programs. In exemplary embodiments, loadsets with common included or affiliated data files or programs must be accepted in the order in which they were activated. The online loader 116 may manage rules for the order of activation and acceptance of programs in a loadset, while the VCFX 122 may enforce similar rules for data files.

Further special considerations include managing data files in the file system 120 which are unique to a specific program base. Program base unique files may themselves be executable (i.e., programs stored in the file system, such as Java ".jar" and ".class" files), or they may be intrinsic to the execution of particular programs (e.g., configuration files) and thus must be tied to the program base in which those programs reside. Such files may require a certain amount of special handling to maintain version management that is fully consistent with conventional programs residing in the program base 118. Actions of the online loader 116 with respect to loadsets apply to processors running on the same program base 118. In exemplary embodiments, to obtain equivalent version management between programs within the program base 118 and program base unique files within the file system 120, program base unique files residing in the file system 120 are tied to the program base 118.

To establish a connection between the program base 118 and the file system 120, a subdirectory (e.g., "/sys/prog") may be placed in the root file system 120 to represent the home directory of all program base unique files. In addition, a set of root directories (e.g., "/progx"), each identifying a specific program base, may be provided to hold the program base unique files associated with each program base, such as the program base 118. Lookups of path names that begin with the program base unique directory (e.g., "/sys/prog") are redirected to the appropriate directory (e.g., "/progx") for the program base 118 on which the processor is currently running.

In exemplary embodiments, authorization to create and delete entries in program base unique directories (e.g., "/progx") and any of their subdirectories is limited to the online and offline loaders 112 and 116. A program base unique file may be installed on the online system 102 using loaders 112 and 116, specifying a target location contained in the virtual subdirectory (e.g., "/sys/prog"). The online loader 116 resolves the virtual subdirectory (e.g., "/sys/prog") and deploys the file to the proper directory (e.g., "/progx").

The subdirectories, files, and links which may be created for a program base unique file are transparently created in the appropriate directory (e.g., "/progx") as a result of the initial redirection in a lookup using the virtual subdirectory (e.g., "/sys/prog"). Links through the VCFX 122 may continue to be formulated in terms of the virtual target location (e.g., "/sys/prog/") rather than the specific program base (e.g., "/progx/"), since the VCFX 122 is processor unique and is repopulated during a restart of the online system 102.

Technical effects and benefits of exemplary embodiments include transparent version control of arbitrary byte stream files grouped, together with possibly one or more programs, as a loadset. The loadset enables the arbitrary byte stream files to be dynamically managed as a unit, supporting activities such as loading, activating, deactivating, and unloading of the files collectively. Loadsets further enable maintenance and updates to a real-time system without halting or resetting the system, while managing all programs and files associated with change versions in a coherent manner.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method for file version control management, the method comprising:
   receiving a loadset of at least one data file; and
   activating the loadset, comprising:
   for each data file in the loadset:
   writing the data file to a target system and identifying the data file by a base name and a unique generation number;
   creating a symbolic link with an activation number in a version control file index (VCFX) to the data file written to the target system;
   providing an application view to the symbolic link as the base name of the data file; and
   limiting the application view to the symbolic link based on an activation number of the application corresponding to the activation number of the symbolic link.

2. The method of claim 1, further comprising:
   accepting the loadset, comprising:
   renaming each of the data files written to the target system to the base name of the data file; and
   removing the symbolic links to each of the data files.

3. The method of claim 1, further comprising:
   deactivating the loadset, comprising:
   removing the symbolic links to each of the data files written to the target system; and
   removing each of the data files written to the target system.

4. The method of claim 1, wherein the loadset further comprises at least one program.

5. The method of claim 1, wherein the data file is included in the loadset.

6. The method of claim 1, wherein the data file is affiliated in the loadset.

7. The method of claim 1, wherein the data file is a program base unique file.

8. The method of claim 7, further comprising:
   linking the program base unique file to a program base through a virtual directory.

9. A system for file version control management, the system comprising:
   a target file system;
   a version control file index (VCFX); and
   an online loader application, the online loader application performing:
   receiving a loadset of at least one data file; and
   activating the loadset, comprising:
   for each data file in the loadset:
   writing the data file to the target file system and identifying the data file by a base name and a unique generation number;
   creating a symbolic link with an activation number in the VCFX to the data file written to the target file system;
   providing an application view to the symbolic link as the base name of the data file; and
   limiting the application view to the symbolic link based on an activation number of the application corresponding to the activation number of the symbolic link.

10. The system of claim 9, wherein the online loader application further performs:
    accepting the loadset, comprising:
    renaming each of the data files written to the target file system to the base name of the data file; and
    removing the symbolic links to each of the data files.

11. The system of claim 9, wherein the online loader application further performs:
    deactivating the loadset, comprising:
    removing the symbolic links to each of the data files written to the target file system; and removing each of the data files written to the target file system.

12. The system of claim 9 wherein the loadset further comprises at least one program.

13. The system of claim 9, wherein the data file is included in the loadset.

14. The system of claim 9, wherein the data file is affiliated in the loadset.

15. The system of claim 9, wherein the data file is a program base unique file.

16. The system of claim 9, wherein the online loader application further performs:
   linking the program base unique file to a program base through a virtual directory.

17. A computer program product for file version control management, the computer program product comprising:
   a non-transitory storage medium readable by a processing circuit and storing instructions for execution by the processing circuit for facilitating a method comprising:
   receiving a loadset of at least one data file; and
   activating the loadset, comprising:
   for each data file in the loadset:
   writing the data file to a target system and identifying the data file by a base name and a unique generation number;
   creating a symbolic link with an activation number in a version control file index (VCFX) to the data file written to the target system;
   providing an application view to the symbolic link as the base name of the data file; and
   limiting the application view to the symbolic link based on an activation number of the application corresponding to the activation number of the symbolic link.

18. The computer program product of claim 17, wherein the instruction further facilitate:
   accepting the loadset, comprising:
   renaming each of the data files written to the target system to the base name of the data file; and
   removing the symbolic links to each of the data files.

19. The computer program product of claim 17, wherein the instructions further facilitate:
   deactivating the loadset, comprising:
   removing the symbolic links to each of the data files written to the target system; and
   removing each of the data files written to the target system.

20. The computer program product of claim 17, wherein the loadset further comprises at least one program.

* * * * *